(12) United States Patent
Kolar et al.

(10) Patent No.: US 6,693,813 B2
(45) Date of Patent: Feb. 17, 2004

(54) DEVICE FOR QUASI-DIRECT PULSE-WIDTH CONTROLLED ENERGY CONVERSION BETWEEN THREE-PHASE SYSTEM

(75) Inventors: Johann Walter Kolar, Zurich (CH); Johann Ertl, Mauerkirchen (AT)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/205,493

(22) Filed: Jul. 26, 2002

(65) Prior Publication Data

US 2003/0021126 A1 Jan. 30, 2003

(30) Foreign Application Priority Data

Jul. 27, 2001 (AT) .......................................... 1179/2001

(51) Int. Cl.$^7$ .............................................. H02M 5/275
(52) U.S. Cl. ........................................ 363/163; 363/159
(58) Field of Search ................................ 363/157, 159, 363/164, 163

(56) References Cited

U.S. PATENT DOCUMENTS 4,675,802 A 6/1987 Sugimoto
5,731,689 A * 3/1998 Sato ............................ 363/132

FOREIGN PATENT DOCUMENTS

JP 8-32177 3/1996

OTHER PUBLICATIONS

Kim et al.; "AC/AC Power Conversion Based on Matrix Converter Topology with Unidirectional Switches", *IEEE Transactions on Industry Applications*, vol. 36, No. 1, pp. 139–145 (Jan./Feb. 2000).

* cited by examiner

*Primary Examiner*—Shawn Riley
(74) *Attorney, Agent, or Firm*—Leydig, Voit & Mayer, Ltd.

(57) ABSTRACT

Three phase input voltage systems and three phase output voltage systems connected between a first rail and a second rail. Each of the three phase input voltage system includes an interruptible power transistor. Two series connected reverse diodes are connected in parallel with the interruptible power transistor. The phase input voltage system is connected with a node of the series connected reverse diodes.

3 Claims, 1 Drawing Sheet

DEVICE FOR QUASI-DIRECT PULSE-WIDTH CONTROLLED ENERGY CONVERSION BETWEEN THREE-PHASE SYSTEM

BACKGROUND OF THE INVENTION

1) Field of the Invention

This invention relates to a device for electronic energy conversion between two three-phase systems without using voltage circuits or direct current-link (DC-link) power circuits.

2) Description of the Related Art

Electronic power converters (inverters) are used in many areas of industrial electronics. With such an electronic power converter, a controlled energy exchange can be achieved between two three-phase systems of different voltage and/or frequency. For certain applications in the areas of power-supply technology or drive engineering, a power flow with bidirectional capability is required, for example in the case of an asynchronous machine drive with regenerative braking, i.e. energy recovery in the supply network.

Conventional converters of this type are achieved by coupling, on the DC-link side, two three-phase pulse-controlled inverters, each consisting of six interruptible semiconductor valves, with a DC-link or an alternating current-link. Although this circuit topology makes the required energy conversion possible, an DC-link reactance element (DC-link capacitor or DC-link resistor) is required in addition to the semiconductor valves. This DC-link reactance element has, in principle, not insignificant current or voltage ratings, which contributes significantly to the unit volume or to the construction costs of the overall device.

Thus, to increase the specific power density and/or to reduce the construction costs of electronic converters for the exchange of energy between three-phase systems, an alternative converter configuration is also well-known, by means of which it is possible to avoid the described DC-link reactance elements and the energy conversion will occur quasi-directly (direct pulse converter). The conventional circuit topology is used here, with which each output phase of the converter can be switched by means of an electronic three-pole switch to any of the three phases of the supplying input voltage systems as desired. By appropriate pulse-width controlled clocking of the three-pole switch, any selectable (e.g. sinusoidal variable) voltage can be generated at the output within the control limits-mediated through the operating interval. The control of each individual three-pole switch occurs through the use of three appropriately interconnected and controlled single-pole electronic switches. Due to the resulting overall configuration (consisting of three phases for each three single-pole electronic switches), converters of this type are also designated as "matrix pulse converters", because the required total of nine electronic switches are drawn in the circuit diagram mostly in the form of a 3×3 matrix configuration. However, the disadvantage of this well-known configuration is that the nine electronic switches are bidirectionally loaded by the current and bipolar voltage, i.e. semiconductor elements are required for them that can be operated in all the four possible quadrants of the current/voltage characteristics. "Symmetrically" interruptible electronic switches of this type, however, could not be produced so far in the relevant power range as single semiconductors for a variety of reasons related to semiconductor physics, but are usually materialized through a counter-series circuit of two power transistors, each with reverse diodes laid out in parallel. This requires a relatively large number of power transistors (a total of 18 MOSFETs or IGBTs), which is a major disadvantage of the direct-pulse inverters.

SUMMARY OF THE INVENTION

It is an object of this invention to provide a configuration, which enables electronic energy conversion between two three-phase systems thereby dispensing with an DC-link and has a reduced number of the required power transistors in comparison with the well-known direct-pulse converter configuration.

The device according to the present invention includes three half-bridge arms on its DC voltage side, specially formed bridge connections. Moreover, the DC-link capacitor is not provided. By an appropriate control of the input-side bridge connections it is ensured that the positive input voltage required for the proper functioning of the output-side conventional half-bridge connections is always available at the AC-side coupling point. According to the present device, it is possible to implement all the operating states of the well-known direct pulse converter. Moreover, the device possesses a smaller number of power transistors than the conventional direct-pulse converter.

These and other objects, features and advantages of the present invention are specifically set forth in or will become apparent from the following detailed descriptions of the invention when read in conjunction with the accompanying drawings.

DETAILED DESCRIPTIONS

Figure 1:
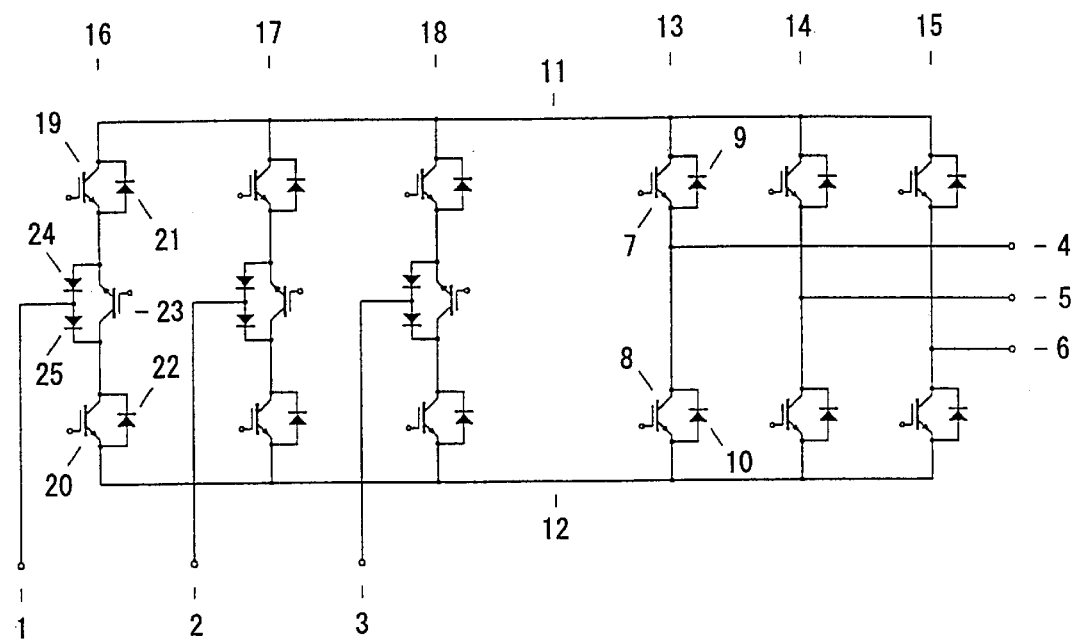
FIG. 1 is a basic configuration (simplified, schematic diagram) of a device for quasi-direct control pulse-width controlled energy conversion between two three-phase systems, resulting from the modification or extension according to the invention of the circuit of a well-known three-phase voltage DC-link pulse converter.

The device according to the present invention will be explained in detail with reference to the accompanying drawings.

A circuit topology of the device according to the present invention is shown in FIG. 1. This device comprises a three phase input voltage systems 1, 2, 3 and a three phase output voltage systems 4, 5, 6. This device achieves quasi-direct energy conversion, i.e. without a DC-link operating, bidirectional energy conversion, between the three phase input voltage systems 1, 2, 3 and the three phase output voltage systems 4, 5, 6. Amplitudes, frequencies and phase angles of the input or output voltage system are arbitrarily selectable within the control limits by an appropriate pulse-width modulated clock pulse, in case of averaging by means of a short operating cycle in comparison with the period of the input or output voltage.

The circuit topology shown is partly based on a circuit structure of the kind well-known from three-phase voltage DC-link pulse converters. The three-phase voltage DC-link pulse converter is formed by three identical half-bridge arms 13, 14, 15, which are placed between a more positive voltage rail 11 and a more negative voltage rail 12. The three half-bridge arms consist in a well-known manner of two interruptible semiconductor valves 7, 8 within-parallel placed reverse diodes 9, 10 and act—assuming a complementary control of the semiconductor valves—as electronically controlled converters, with which the output voltage point 4 can be switched to either the more positive voltage rail 11 or to the more negative voltage rail 12.

In contrast to the well-known voltage-link type pulse converter, in which the DC-link voltage circuit (that is, the voltage difference between the rails 11 and 12) is preselected by a DC-link circuit capacitor, this voltage difference is defined in the device of the present invention by the operating state of three additional valve arms 16, 17, 18, each of which is equipped with three power transistors which, in turn, are also placed between the rails 11 and 12.

These input-side valve arms 16, 17, 18 are also of a half-bridge-like configuration, each is made of two power transistors 19, 20 with in-parallel placed reverse diodes 21, 22. As distinct from the well-known half-bridge configurations, however, the emitter terminal of the transistor of the upper bridge half is not connected directly to the collector terminal of the transistor of the lower bridge half, but is connected via an additional power transistor 23. The latter is placed in such a way that its emitter terminal is interconnected with the emitter of transistor 19 and its collector terminal with the collector of transistor 20. Two serially connected reverse diodes 24, 25 are connected in parallel to transistor 23 and the respective phase of the input voltage system 1, 2, 3 is connected to the node of the diodes 24, 25. By this extension with the transistor 23 and the diodes 24, 25, the input-side valve arms 16, 17, 18 (in contrast to the output-side half-bridge arms 13, 14, 15, which functionally only represent two-terminal switches between the rails 11, 12) may switch off completely, that is, cut off the respective current flow from the input voltage system 1, 2, 3.

An analysis of all the operating states of the overall system shows that with the circuit topology shown in FIG. 1, connections relevant to the operation as pulse-width controlled direct energy converters, may be implemented between the three-phase systems 1, 2, 3 and 4, 5, 6, which is also the case with the well-known direct-pulse converters and it can also be made sure that the required, always positive voltage difference is available between the rails 11, 12. The device according to this invention ("quasi-direct pulse converter") however, will only require 15 power transistors in comparison to the well-known pulse converter with its 2×9 transistors, thus saving 3 transistors.

In the same manner as the well-known matrix type pulse converter, the quasi-direct pulse converter of the present invention also features a discontinuous current flow from the three phase input voltage systems 1, 2, 3, for which reason, an input filter (not shown in FIG. 1) has also to be generally provided, whose cut-off frequency has to be designed to be significantly below the operating frequency of the pulse converter.

Controlling the entire converter system is done advantageously according to the invention in such a way that the input-side valve arms 16, 17, 18 are controlled by a low operating frequency, so that the input voltage system 1,2, 3 is always positively impressed and sectionally imaged between the rails 11, 12. The formation of the required output voltage system 4, 5, 6 takes place through pulse-width modulation of the output-side half-bridge arms 13, 14, 15 at a high operation frequency. Thus several cycles of operation of the output-side half-bridge arms 13, 14, 15 occur in a circuit state of the input-side valve arms 16, 17, 18.

As an alternative, control of the converter systems can also be done in such a way that the output-side half-bridge arms 13, 14, 15 are triggered with a low operating frequency so that the currents flowing, section by section, into the output voltage system 4, 5, 6 are always routed in such a way that a positive voltage is formed between the rails 11, 12. The input-side valve arms 16, 17, 18 are now controlled through the pulse-width modulation with a high operating frequency so that the desired input voltage system 1, 2, 3 is produced. In this control variant, therefore, several operating cycles of the input-side valve arms 16, 17, 18 occur in one operating condition of the output-side half-bridge arms 13, 14, 15.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A device for quasi-direct pulse-width controlled bidirectional energy conversion, comprising:

three phase input voltage systems and three phase output voltage systems connected between a first rail and a second rail, each of the three phase output voltage systems including a half-bridge arm, each half-bridge arm including first and second interruptible power transistors and an in-parallel placed reverse diode, each of the three phase input voltage systems including a half-bridge-like valve arm, each half-bridge-like valve arm including first and second power transistors and an in-parallel placed reverse diode, wherein in each of the three phase input voltage systems a collector of the first power transistor is connected with the first rail, an emitter of the second power transistor is connected with the second rail, an interruptible power transistor is connected with the first and second power transistors, an emitter of the interruptible power transistor is connected with an emitter of the first power transistor and the collector is connected with a collector of the second power transistor, two series connected reverse diodes are connected in parallel to the interruptible power transistor, and the three phase input voltage system is connected with a node of the series connected reverse diodes.

2. The device according to claim 1, wherein control of the system takes place in such a way that the input-side valve arms with low operating frequency are controlled so that the input voltage system is always impressed, section by section, positively imaged between the first and second rails, whereas the generation of the output voltage system occurs through pulse-width modulation of the output-side half-bridge arms at high operation frequency, so that in the operating state of the input-side valve arms several operation cycles of the output-side half-bridge arms are taking place.

3. The device according to claim 1, wherein control of the system takes place in such a way that the output-side half-bridge arms with low operating frequency are controlled so that the currents of the output voltage system are always routed section by section in such a way that a positive voltage is formed between the first and second rails, whereas the input-side valve arms are controlled through pulse-width modulation with high operating frequency, so that the desired input voltage system is formed, whereby several operating cycles of the input-side valve arms occur in an operating state of the output-side half-bridge arms.

* * * * *